United States Patent
Tatara et al.

(10) Patent No.: US 9,120,418 B2
(45) Date of Patent: Sep. 1, 2015

(54) VEHICLE LAMP WITH VIBRATOR

(75) Inventors: Naoki Tatara, Shizuoka (JP); Toru Takahashi, Shizuoka (JP); Yuji Sugiyama, Shizuoka (JP); Atsushi Sugimoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 284 days.

(21) Appl. No.: 13/602,647

(22) Filed: Sep. 4, 2012

(65) Prior Publication Data

US 2013/0058121 A1    Mar. 7, 2013

(30) Foreign Application Priority Data

Sep. 2, 2011 (JP) ................................. 2011-191262
May 11, 2012 (JP) ................................. 2012-108985

(51) Int. Cl.
| | |
|---|---|
| *B60Q 1/26* | (2006.01) |
| *B60Q 1/00* | (2006.01) |
| *B60Q 5/00* | (2006.01) |
| *G10K 9/22* | (2006.01) |
| *G10K 9/13* | (2006.01) |
| *G10K 9/20* | (2006.01) |

(52) U.S. Cl.
CPC .............. *B60Q 1/0017* (2013.01); *B60Q 5/008* (2013.01); *G10K 9/13* (2013.01); *G10K 9/20* (2013.01); *G10K 9/22* (2013.01)

(58) Field of Classification Search
USPC .......................... 362/507, 546, 487; 340/474
See application file for complete search history.

(56) References Cited

U.S. PATENT DOCUMENTS

| | | | | | |
|---|---|---|---|---|---|
| 1,958,028 | A | * | 5/1934 | Aymar | ........................ 340/815.7 |
| 2,632,154 | A | * | 3/1953 | Pouell | ............................ 340/474 |
| 4,184,102 | A | * | 1/1980 | Arai | .................................. 315/47 |
| 4,851,813 | A | * | 7/1989 | Gottlieb | ......................... 340/474 |
| 4,903,007 | A | * | 2/1990 | Gottlieb | ......................... 340/474 |
| 5,047,747 | A | * | 9/1991 | Gottlieb | ......................... 340/474 |
| 5,546,284 | A | | 8/1996 | Harada | |
| 6,064,302 | A | * | 5/2000 | Peterson et al. | .............. 340/474 |
| 6,068,392 | A | | 5/2000 | Ohtaki et al. | |
| 6,154,125 | A | * | 11/2000 | McAuley et al. | ............. 340/474 |
| 6,273,594 | B1 | | 8/2001 | Ikeda et al. | |
| 6,977,584 | B2 | * | 12/2005 | Milliken | ........................ 340/474 |
| 8,669,852 | B2 | * | 3/2014 | Neufeglise et al. | ........... 340/474 |

(Continued)

FOREIGN PATENT DOCUMENTS

| | | |
|---|---|---|
| CN | 2527858 Y | 12/2002 |
| CN | 1548333 A | 11/2004 |
| JP | 2007283809 A | 11/2007 |

OTHER PUBLICATIONS

English Patent Abstract of JP 2007-283809, from Esp@cenet, Publication Date: Nov. 1, 2007 (1 Page).
Partial European Search Report issued in counterpart European Patent Application No. 12182628.3 dated Mar. 18, 2014 (7 pages).
Chinese Office Action for Application No. 201210321308.7, mailed on Jul. 2, 2014 (14 pages).

(Continued)

*Primary Examiner* — Ismael Negron
(74) *Attorney, Agent, or Firm* — Osha Liang LLP

(57) ABSTRACT

A vehicle lamp includes a light source, a front cover made of a transparent material to transmit light emitted by the light source, a lamp body forming a lamp housing together with the front cover, and a vibrator configured to vibrate the front cover to generate a vibration sound. The vibrator is supported by the lamp housing such that the vibrator contacts the front cover at a location where, when the vehicle lamp is mounted on a vehicle, the vibrator is not visible from an outside of the vehicle lamp.

12 Claims, 16 Drawing Sheets

(56) References Cited

U.S. PATENT DOCUMENTS

2004/0032744 A1 2/2004 Nishizawa et al.
2010/0141419 A1* 6/2010 Coward .................. 340/464

OTHER PUBLICATIONS

Extended European Search Report for Application No. 12182628.3, mailed on Jul. 10, 2014 (11 pages).

* cited by examiner

VEHICLE LAMP WITH VIBRATOR

CROSS-REFERENCE TO RELATED APPLICATIONS

The present application claims priority from Japanese Patent Application No. 2011-191262 filed on Sep. 2, 2011 and Japanese Patent Application No. 2012-108985 filed on May 11, 2012, the entire contents of which are incorporated herein by reference.

BACKGROUND OF INVENTION

1. Field of the Invention

The present invention relates to a vehicle lamp that can sound an alarm to other vehicles and pedestrians.

2. Related Art

In motor driven vehicles, such as hybrid vehicles and electric vehicles, a motor is quiet at low speed so that it is difficult to be perceived by other vehicles and pedestrians. To address this problem, there has been proposed to generate a pseudo engine sound separately from the motor sound and to alert other vehicles and pedestrians using the pseudo engine sound. For example, a related art vehicle lamp is configured such that a vibrator is provided on a headlight cover to vibrate the headlight cover, so that the headlight cover functions as a speaker (see, e.g., JP 2007-283809 A).

The vibrator is arranged at a position where the vibrator does not block a part of irradiation light emitted by a light source of the headlight and traveling through the headlight cover. However, the vibrator may be visible through the headlight cover when the headlight is viewed from the outside, in which case the external appearance of the headlight is deteriorated. Moreover, in the case of a headlight having a structure in which the headlight cover is fixed to the headlight body in a hermetically sealed manner, attachment of the vibrator to the inner side of the headlight cover requires cumbersome steps during assembly. Further, because it is difficult to take the vibrator out of the headlight, it is disadvantageous in terms of maintenance.

SUMMARY OF INVENTION

One or more embodiments of the present invention provide a vehicle lamp configured to generate a sound by vibrating the lamp without deteriorating the external appearance of the lamp.

According to one or more embodiments of the present invention, a vehicle lamp includes a light source, a front cover made of a transparent material to transmit light emitted by the light source, a lamp body forming a lamp housing together with the front cover, and a vibrator configured to vibrate the front cover to generate a vibration sound. The vibrator is supported by the lamp housing such that the vibrator contacts the front cover at a location where, when the vehicle lamp is mounted on a vehicle, the vibrator is not visible from an outside of the vehicle lamp.

Other aspects and advantages of the invention will be apparent from the following description, the drawings and the claims.

DETAILED DESCRIPTION

Hereinafter, embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
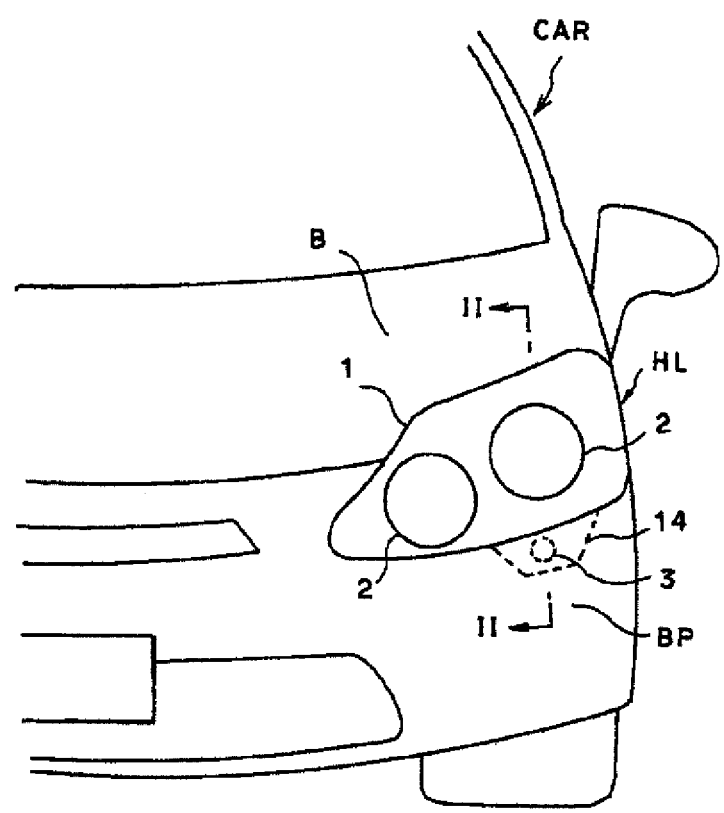
FIG. 1 is a front view of a vehicle lamp according to one or more embodiments of the present invention.
Figure 2:
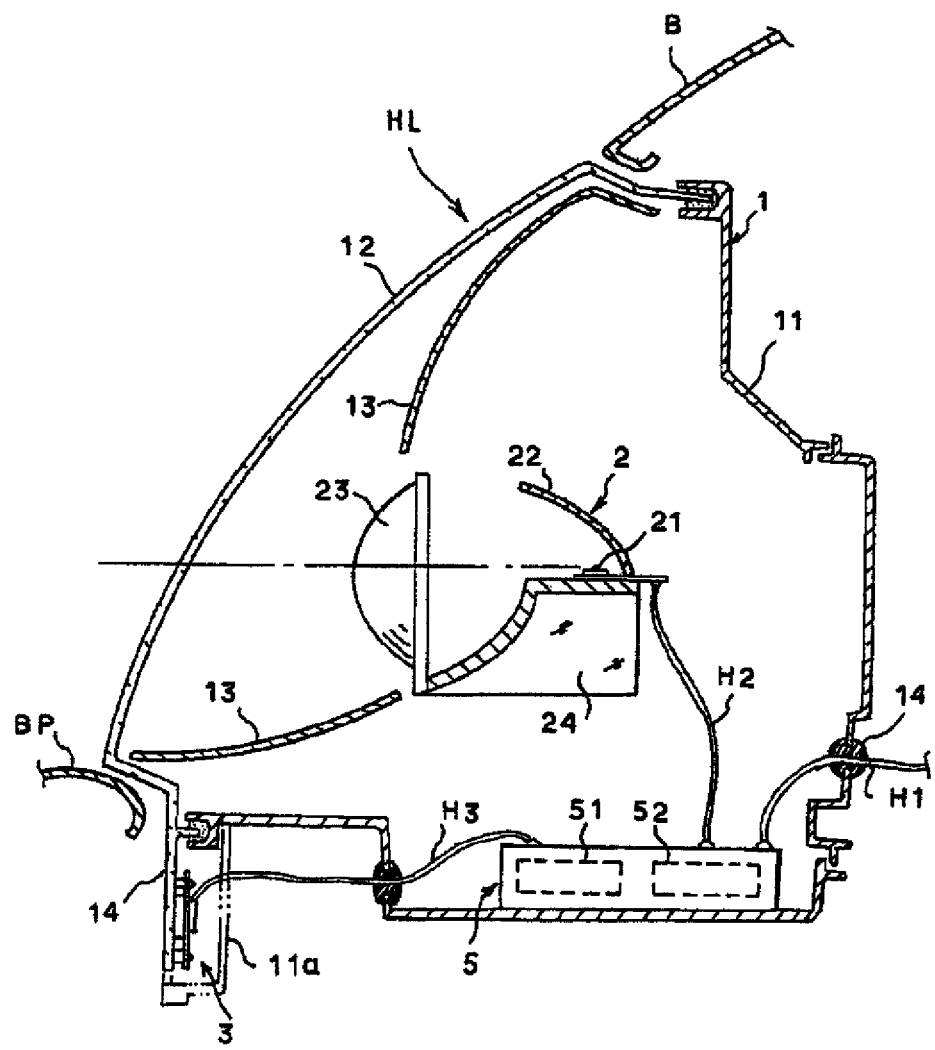
FIG. 2 is a cross-sectional view taken along the line II-II of FIG. 1, illustrating a headlamp according to a first embodiment of the present invention.

FIG. 1 is a front view of a portion of a vehicle where a headlamp HL (an example of a vehicle lamp) according to one or more embodiments of the present invention is provided, and FIG. 2 is a longitudinal cross-sectional view taken along line II-II of FIG. 1. A lamp housing 1 of the headlamp HL includes a lamp body 11 having a front opening and a front cover 12 attached to the lamp body 11 to cover the front opening of the lamp body 12. The lamp body 11 is configured to have a form of a container. The front cover 12 is made of a transparent resin. Lamp units 2, each including a light source, are installed inside the lamp housing 1. The lamp units 2 are arranged such that, when the lamp units 2 are turned on, light emitted by each of their light sources passes through the front cover 12. The headlamp HL is provided in an opening formed between a body panel B and a front bumper BP of the vehicle. The body panel B is, for example, a trunk lid or a fender.

FIG. 2 illustrates one of the lamp units 2. The lamp unit 2 according to this illustrated example is a projector-type lamp unit. The lamp unit 2 includes an ellipsoidal reflector 22, a light source 21, e.g., a light-emitting diode (LED), provided at a location surrounded by the reflector 22, and a projection lens 23 configured to forwardly project light emitted by the LED 21 and reflected by the reflector 22. The LED 21, the reflector 22, and the projection lens 23 are provided on a base 24. An extension 13 (an ornamental reflector) is arranged inside the lamp housing 1 to conceal unnecessary area inside the lamp housing 1 from a front view of the headlamp HL, thereby improving an external appearance of the headlamp HL.

The lower portion of the front cover 12 is extended down to the bottom of the lamp housing 1 so that it is not visible when the headlamp HL is viewed from the outside. That is, as illustrated in FIG. 1, this extended portion 14 is covered and concealed by the extension 13 and the front bumper BP of the vehicle. The extended portion 14 has a shape of a flat plate. A vibrator 3 is attached to a rear surface of the extended portion 14, i.e., a portion of the inner surface of the front cover 12. The vibrator 3 is, but not limited to, an electromagnetic vibrator. The electromagnetic vibrator 3 vibrates by an electromagnetic action when current is applied. Along with its vibration, the electromagnetic vibrator 3 vibrates the extended portion 14 of the front cover 12 or the entire front cover 12 so that the front cover 12 functions as a sounding plate that generates an alarm sound.

Figure 3A:
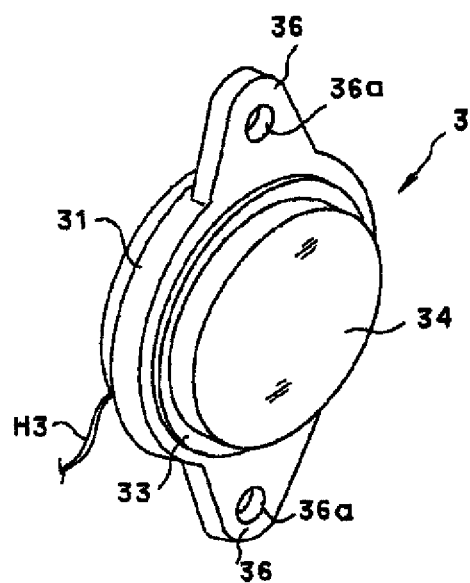
FIG. 3A is a perspective view of an electromagnetic vibrator provided in the headlamp.
Figure 3B:
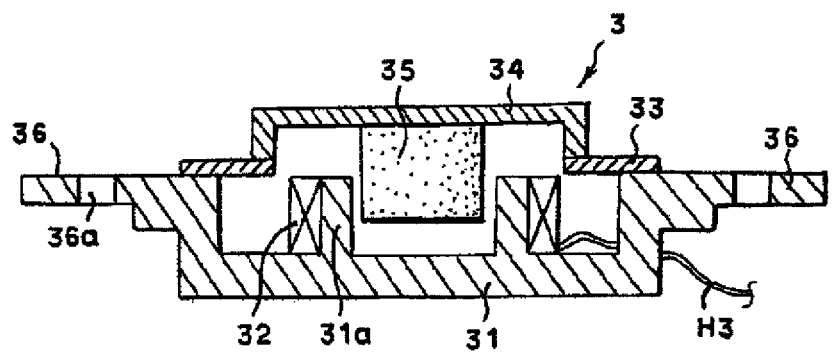
FIG. 3B is a longitudinal cross-sectional view of the electromagnetic vibrator.

As shown in FIGS. 3A and 3B, the electromagnetic vibrator 3 includes a body 31 having a shape of a cylindrical container, a drive coil 32 wound around a cylindrical core 31a of the body 31, an annular spring plate 33 having an outer peripheral edge portion attached to an opening portion of the body 31, a vibrating plate 34 attached to an inner peripheral edge portion of the spring plate 33, and a columnar magnet 35 (a permanent magnet) attached to the inner surface of the vibrating plate 34 and partially disposed in a hollow portion of the cylindrical core 31a surrounded by the drive coil 32. The electromagnetic vibrator 3 also has tabs 36 protruding in the radial direction from two locations on the outer peripheral surface of the body 31. Each of the tabs 36 is formed with an insertion hole 36a into which a screw is inserted. A harness H3 is connected to the coil 32, and is led to the outside through the body 31.

When alternate current is applied to the drive coil 32 through the harness H3, the magnet 35 vibrates in the axial direction of the cylindrical core 31a by an alternating magnetic field generated by the drive coil 32 and a magnetic field of the magnet 35. The vibrating plate 34, to which the magnet 35 is attached, is vibrated accordingly in its thickness direction while flexing the spring plate 33. The vibration of the magnet 35 and the vibrating plate 34 is transmitted to the body 31.

Figure 4:
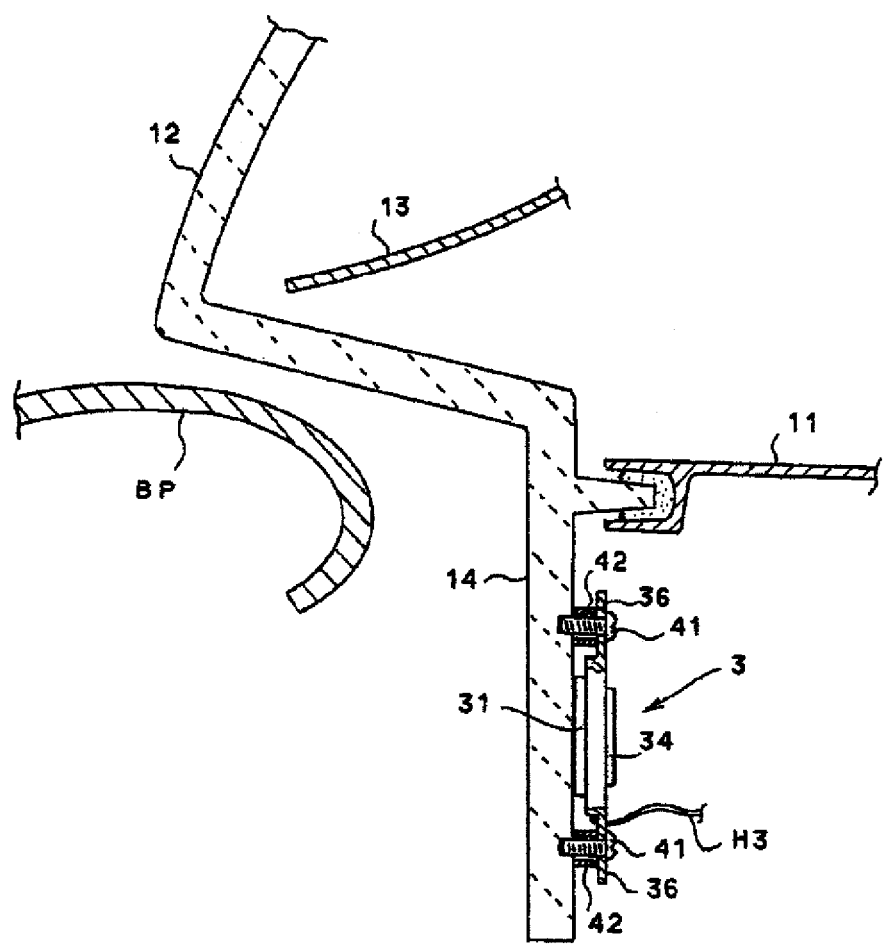
FIG. 4 is an enlarged view of a portion of the headlamp according to the first embodiment.

FIG. 4 is an enlarged view of a portion of FIG. 2. The electromagnetic vibrator 3 is fixed to the inner surface of the extended portion 14 of the front cover 12 by screws 41 inserted into the insertion holes 36a of the tabs 36. Collars 42 having a suitable size are interposed between the tabs 36 and the extended portion 14, so that the front surface of the body 31 of the electromagnetic vibrator 3 firmly contacts the rear surface of the extended portion 14. As shown in FIG. 2, the harness H3 connected to the electromagnetic vibrator 3 is electrically connected to a lamp control unit 5 inside the lamp housing 1. The lamp control unit 5 includes a sounding controller 51 and a lighting controller 52. The lamp control unit 5 is connected to a central control unit of the vehicle via a harness H1. The lighting controller 52 is connected to the lamp unit 2 via a harness H2 to control the lighting of the lamp unit 2. The sounding controller 51 is connected to the electromagnetic vibrator 3 via the harness H3 to control the sounding of the electromagnetic vibrator 3.

When the electromagnetic vibrator 3 is driven by the sounding controller 51 of the lamp control unit 5, the magnet 35 and the vibrating plate 34 vibrate together, and this vibration is transmitted to the body 31. The vibration is further transmitted to substantially the entire portion of the front cover 12 from the extended portion 14, whereby the front cover 12 is vibrated to generate an alarm sound. When the headlamp HL is observed from the outside, the electromagnetic vibrator 3 is not visible through the front cover 12 because it is covered and concealed by the extension 13 and the bumper BP. Accordingly, the external appearance of the headlamp HL is not deteriorated by the vibrator 3. The location of the electromagnetic vibrator 3 is outside the optical path of the light from the lamp unit 2, so that the electromagnetic vibrator 3 does not affect the light distribution from the headlamp HL. Moreover, the extended portion 14 of the front cover 12, to which the electromagnetic vibrator 3 is fixed, is disposed outside of the lamp housing 1. Therefore, the electromagnetic vibrator 3 can be easily attached to or detached from the front cover 12. Accordingly, the electromagnetic vibrator 3 is easy to attach and to maintain.

Figure 5:
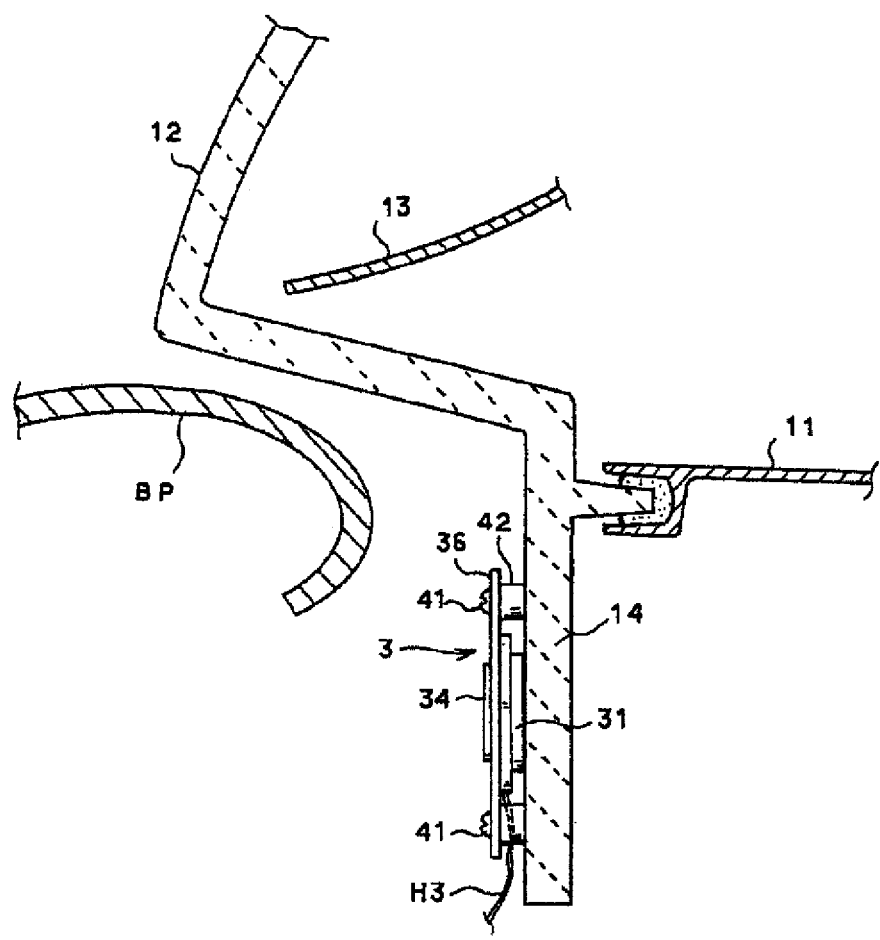
FIG. 5 is an enlarged view of a portion of a headlamp according to a modified example of the first embodiment.

FIG. 5 is a cross-sectional view of a modified example of the first embodiment. In this example, the electromagnetic vibrator 3 is arranged to contact the front surface of the extended portion 14. Other features for fixing the electromagnetic vibrator 3 to the extended portion 14 are the same as the example shown in FIG. 4. Accordingly, detailed description thereof will be omitted. Also with this configuration, when the electromagnetic vibrator 3 is driven by the sounding controller 51 of the lamp control unit 5, the magnet 35 and the vibrating plate 34 vibrate together, and this vibration is transmitted to the body 31. The vibration is further transmitted to substantially the entire portion of the front cover 12 from the extended portion 14, whereby the front cover 12 is vibrated to generate an alarm sound. Further, the electromagnetic vibrator 3 is still covered and concealed by the extension 13 and the bumper BP, so that it is not visible from the outside. Accordingly, the external appearance of the headlamp HL is not deteriorated.

Second Embodiment

Figure 6:
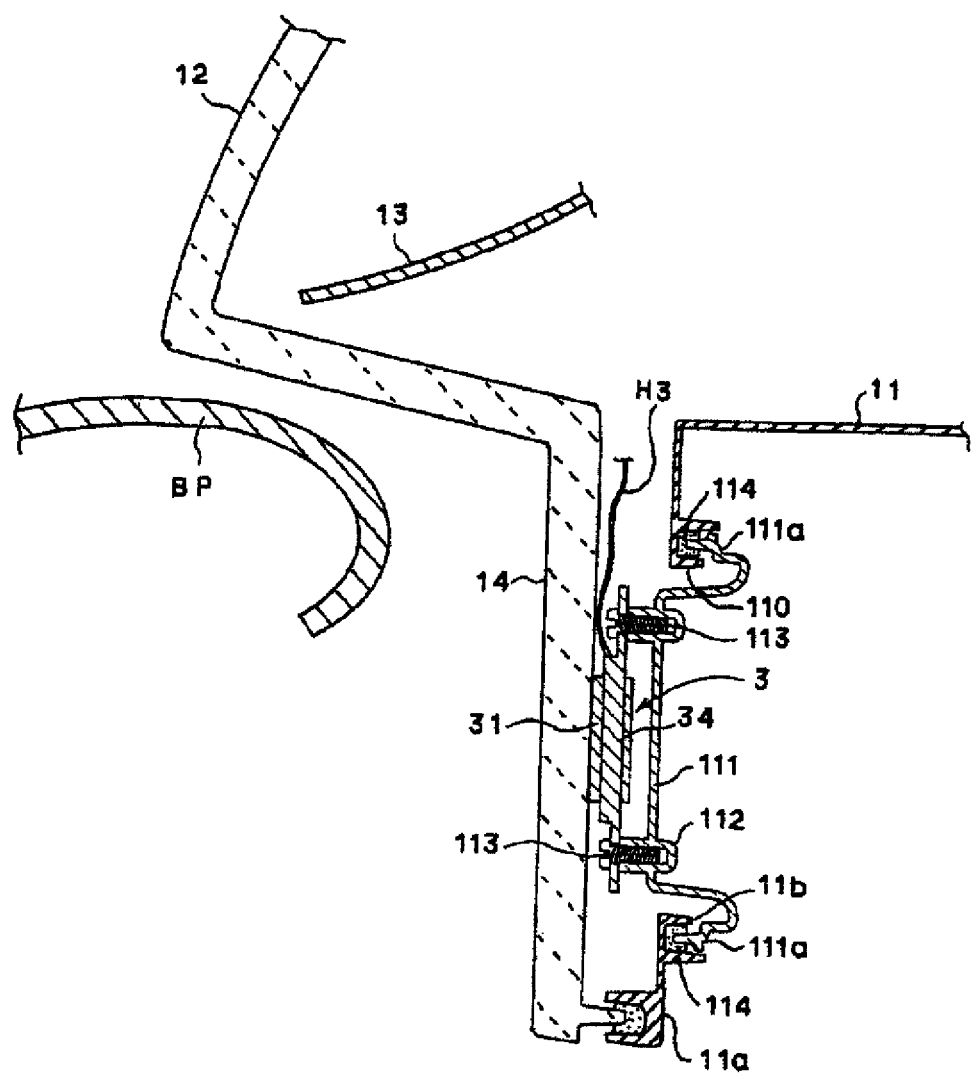
FIG. 6 is an enlarged view of a portion of a headlamp according to a second embodiment of the present invention.

In the configuration according to the first embodiment, the extended portion 14 of the front cover 12 is extended to the outside of the lamp housing 1 and the electromagnetic vibrator 3 for attachment of the extended portion 14. However, the electromagnetic vibrator 3 may be provided inside the lamp housing 1. For example, as shown in FIG. 2 by a two-dot chain line, a lower peripheral portion 11a of the front opening of the lamp body 11 may be configured to extend downwards such that the extended portion 14 of the front cover 12 faces the lower peripheral portion 11a. FIG. 6 is an enlarged view of a portion of a second embodiment having such a structure. The configuration of the extended portion 14 of the front cover 12 is basically the same as the first embodiment, but it is different from the first embodiment in that the lower peripheral portion 11a of the front opening of the lamp body 11 also extends downward along the extended portion 14. The lower peripheral portion 11a has a mounting hole 110, and a back cover 111 is detachably attached to the lower peripheral portion 11a to close the mounting hole 110. The back cover 111 is attached such that a flange edge 111a formed along the periphery of the back cover 111 is inserted into a recessed groove 11b provided on the lamp body 11. The mounting hole 110 is made watertight by a packing 114 provided in the recessed groove 11b. The electromagnetic vibrator 3 is fixed to the inner surface of the back cover 111. Bosses 112 are formed to protrude from the inner surface of the back cover 111. The electromagnetic vibrator 3 is fixed to the bosses 112 by screws 113 using the tabs 36 provided on the body 31 of the electromagnetic vibrator 3. Each of the bosses 112 is formed to have a suitable length so that a small gap is provided between the vibrating plate 34 of the electromagnetic vibrator 3 and the front surface of the back cover 111 to allow the vibration. The front surface of the body 31 firmly contacts the inner surface of the extended portion 14 of the front cover 12. Like the first embodiment, the harness H3 extends inside the lamp housing 1 to electrically connect the electromagnetic vibrator 3 and the lamp control unit 5.

According to the second embodiment, when the electromagnetic vibrator 3 is driven, the vibration of the magnet 35 and the vibrating plate 34 transmitted to substantially the entire portion of the front cover 12 via the body 31 and the extended portion 14, so that an alarm sound is generated. The vibration of the electromagnetic vibrator 3 is also transmitted to the lamp body 11 via the back cover 111 to generate an alarm sound. That is, substantially the entire headlamp HL is vibrated, so that a higher level of sound is generated. When the headlamp HL is observed from the outside, the electromagnetic vibrator 3 is not visible from the outside through the front cover 12, because it is concealed by the extension 13 and the bumper BP. Accordingly, the external appearance of the headlamp HL is not deteriorated. Further, because the electromagnetic vibrator 3 is mounted on the back cover 111, which is detachably attached to the lamp body 11, the electromagnetic vibrator 3 can be easily attached to or detached from the lamp housing 1. Accordingly, the electromagnetic vibrator 3 is easy to attach and to maintain. Furthermore, because the electromagnetic vibrator 3 is provided inside the lamp housing 1, it is advantageous in that waterproofness of the electromagnetic vibrator 3 is significantly improved.

Third Embodiment

Figure 7:
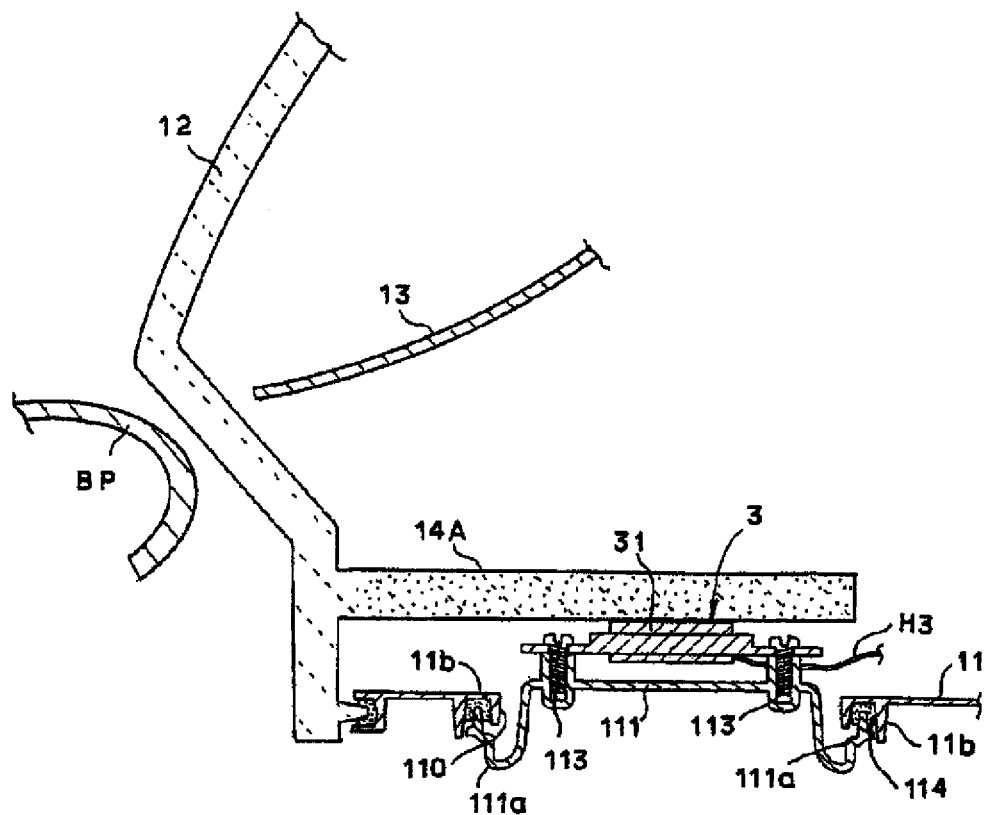
FIG. 7 is an enlarged view of a portion of a headlamp according to a third embodiment of the present invention.

According to a third embodiment illustrated in FIG. 7, the extended portion 14A is formed to rearwardly extend from the lower peripheral portion of the front cover 12 in a shape of a flat plate. The extended portion 14A is arranged in a region below the extension 13 and above the bottom wall of the lamp body 1 to extend along the bottom wall of the lamp body 11. The electromagnetic vibrator 3 may be supported on a back cover 111, detachably attached to the lamp body 11 to close a mounting hole 110 of the lamp body 11 such that the electromagnetic vibrator 3 faces the extended portion 14A. The structure for supporting the electromagnetic vibrator 3 on the back cover 111 may be the same as that of the second embodiment illustrated in FIG. 6. When the back cover 111 is attached to close the mounting hole 110, the body 31 of the electromagnetic vibrator 3 firmly contacts the extended portion 14A. Also with this configuration, the electromagnetic vibrator 3 is not visible from the outside through the front cover 12 by the extension 13 and the bumper BP, so that an alarm sound is generated without deteriorating the external appearance of the headlamp HL. Further, the electromagnetic vibrator 3 can be easily attached to or detached from the lamp housing 1. Accordingly, the maintenance of the electromagnetic vibrator 3 is also easy. Further, a portion of the extended portion 14A illustrated as a stippled region in FIG. 7 may be formed as an opaque cover that does not transmit light, so that the opaque extended portion 14A conceals the electromagnetic vibrator 3 when viewed from the outside through the front cover 12. In this case, a portion of the extension 13 above the extended portion 14A may be omitted.

Fourth Embodiment

Figure 8:
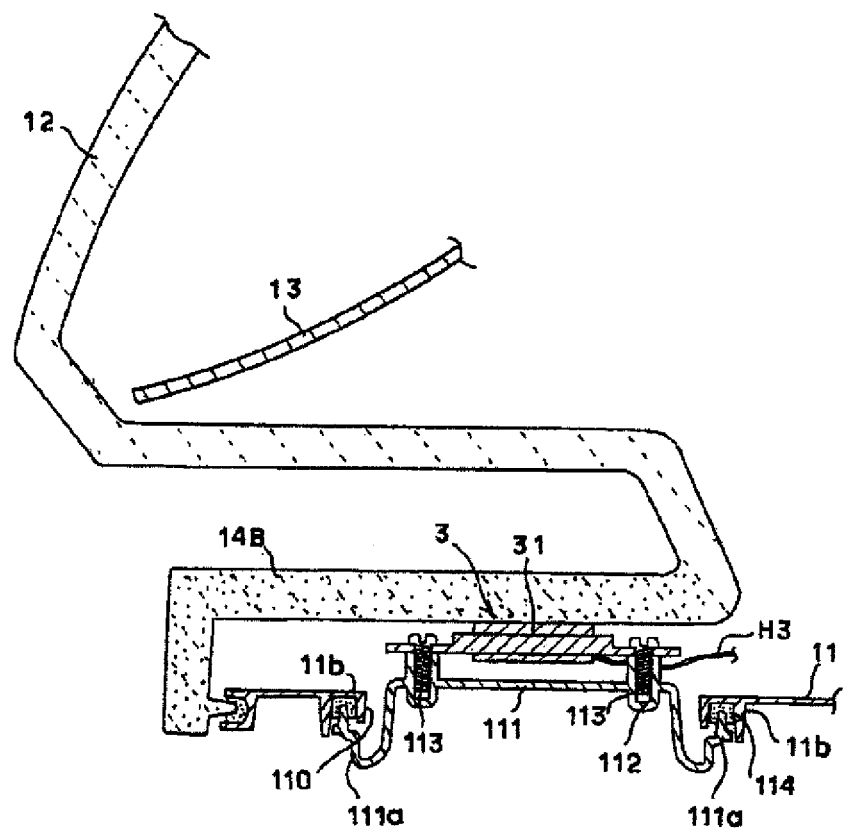
FIG. 8 is an enlarged view of a portion of a headlamp according to a fourth embodiment of the present invention.

Alternatively, as shown in a fourth embodiment of FIG. 8, the lower peripheral portion of the front cover 12 may be formed so as to be recessed rearward in a rectangular shape in a region below the extension 13, and the lower portion of this recessed lower peripheral portion may be formed as an extended portion 14B having a shape of a flat plate and extending rearward. A mounting hole 110 is formed through the lower wall of the lamp body 11 in a region facing the extended portion 14B, and a back cover 111 supporting the electromagnetic vibrator 3 is detachably provided to close the mounting hole 110. The structure for supporting the electromagnetic vibrator 3 on the back cover 111 may be the same as that of the third embodiment. When the back cover 111 is attached to the lamp body 11 to close the mounting hole 110, the body 31 of the electromagnetic vibrator 3 firmly contacts the extended portion 14B. In this example also, the extended portion 14B is formed as an opaque cover that does not transmit light, as illustrated as a stippled region in FIG. 8, so that the opaque extended portion 14B conceals the electromagnetic vibrator 3 when viewed from the outside through the front cover 12. Because the electromagnetic vibrator 3 is not visible from the outside through the front cover 12 by the extended portion 14B, an alarm sound can be generated by the electromagnetic vibrator 3 without deteriorating the external appearance of the headlamp HL. Further, the maintenance of the electromagnetic vibrator 3 is also easy.

Figure 9:
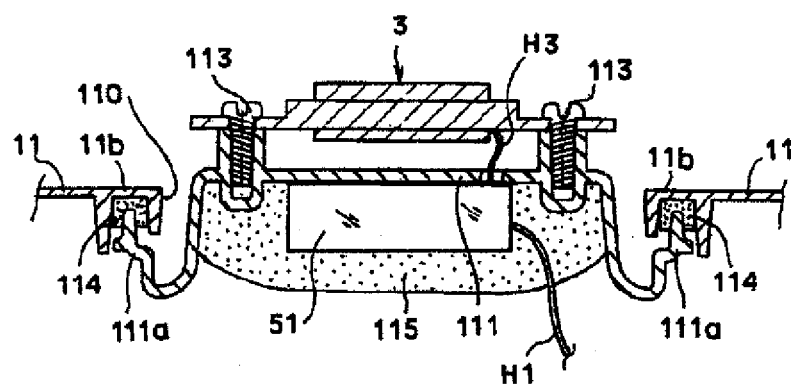
FIG. 9 is a cross-sectional view of a portion of a headlamp according to a modified example of the second to fourth embodiments.

According to the second, third, and fourth embodiments described above, only the electromagnetic vibrator 3 is supported on the back cover 111. However, as shown in FIG. 9, the sounding controller 51 for driving the electromagnetic vibrator 3 may be received and supported on the outer surface of a back cover 111. In the illustrated example, the sounding controller 51 including a circuit board is embedded inside a resin 115 to receive and support the sounding controller 51. The electromagnetic vibrator 3 is connected to the sounding controller 51 via a harness H3 passing through the back cover 111, and a harness H1 connected to the sounding controller 51 is led through the resin 115 and is electrically connected to the lamp control unit 5 or a central control unit of a vehicle. Because the sounding controller 51, the electromagnetic vibrator 3 and the back cover 111 are integrated as a subunit, the sounding device can be provided separately from the lamp control unit 5. Therefore, the lamp control unit 5 can be simplified, and the lamp control unit 5 can be configured for more general purpose. Accordingly, the vibrator 3 can be provided as an option for a vehicle that does not initially have a vibrator or other sounding device for sounding an alarm.

Fifth Embodiment

Figure 10:
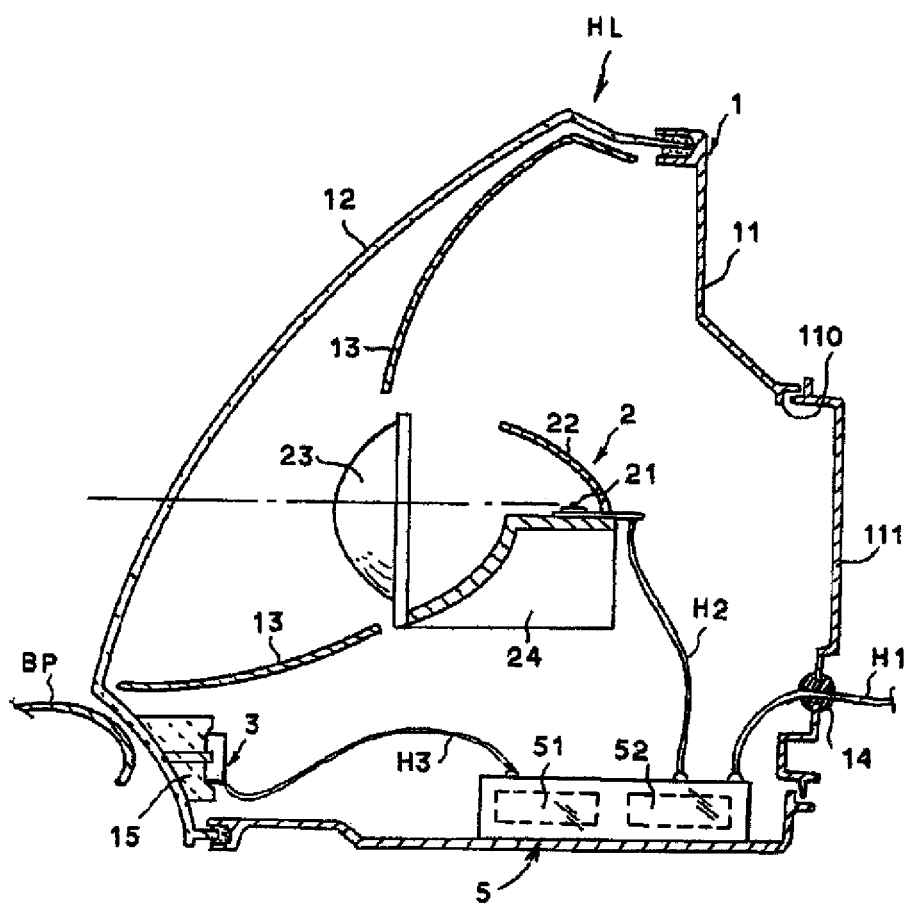
FIG. 10 is a cross-sectional view of a headlamp according to a fifth embodiment of the present invention.

FIG. 10 is a cross-sectional view of a headlamp HL according to a fifth embodiment, where it is difficult to form an extended portion of a front cover 12 due to design constraint, such as a limitation on the size of the headlamp HL. In such a case also, an electromagnetic vibrator 3 may be fixed to an inner surface of a portion of the front cover 12 which, when mounted on a vehicle, is concealed by the bumper BP and the extension 13 so that it is not visible from the outside. The front cover 12 is often three-dimensionally curved so as to conform to the shape of a vehicle body, and it is difficult to bring the flat front surface of the body 31 of the electromagnetic vibrator 3 in firm contact with the inner surface of the front cover 12 if the electromagnetic vibrator 3 is directly fixed to the inner surface of the curved front cover 12. And if the front surface of the body 31 of the electromagnetic vibrator 3 does not firmly contact the inner surface of the front cover 12, the vibration of the electromagnetic vibrator 3 may not be efficiently transmitted to the front cover 12 and may lower sounding efficiency. For example, if the front cover 12 is sloped, only a portion of the circumference of the body 31 of the electromagnetic vibrator 3 may contact the inner surface of the front cover 12. The amplitude of the vibration of the body 31 is usually small at the circumference of the body 31. Therefore, in such as case, the efficiency of the transmission of vibration from the electromagnetic vibrator 3 to the front cover 12 is low. Accordingly, in the fifth embodiment, a fastening seat 15 is integrally molded on a curved inner surface of the front cover 12 to extend inward therefrom, and the electromagnetic vibrator 3 is secured to the fastening seat 15.

Figure 11:
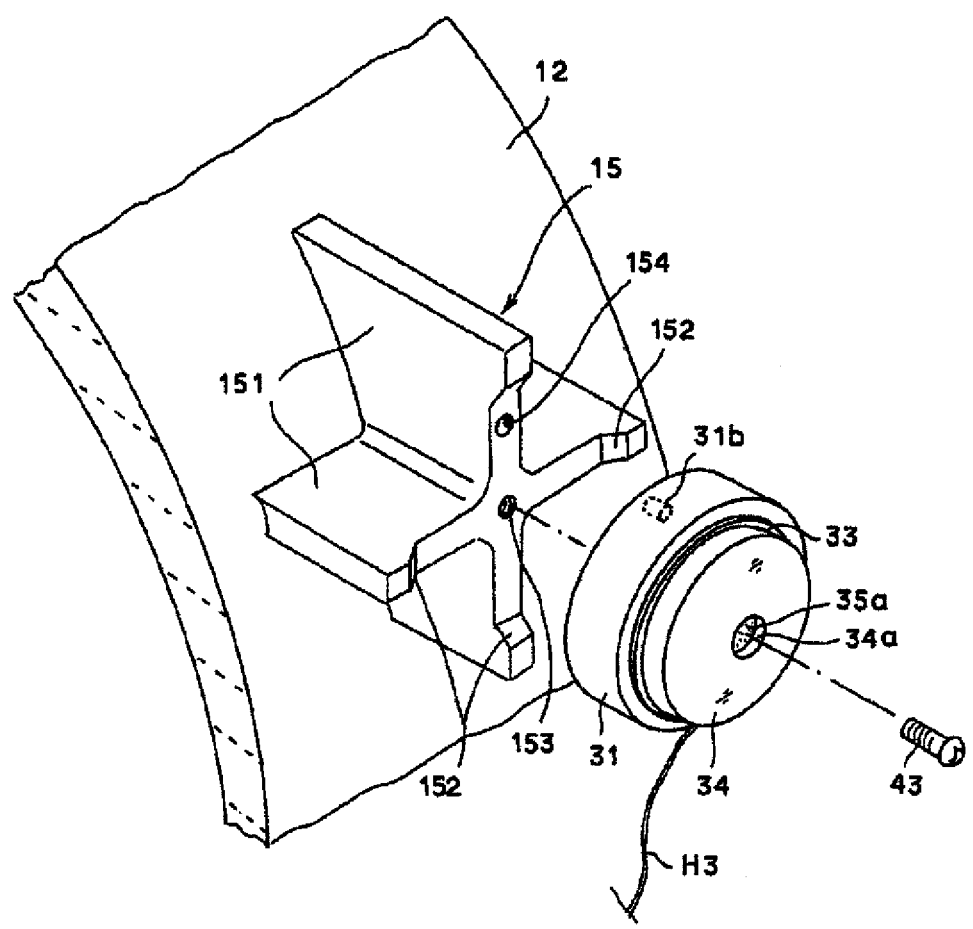
FIG. 11 is a perspective view of a fastening seat and an electromagnetic vibrator.
Figure 12:
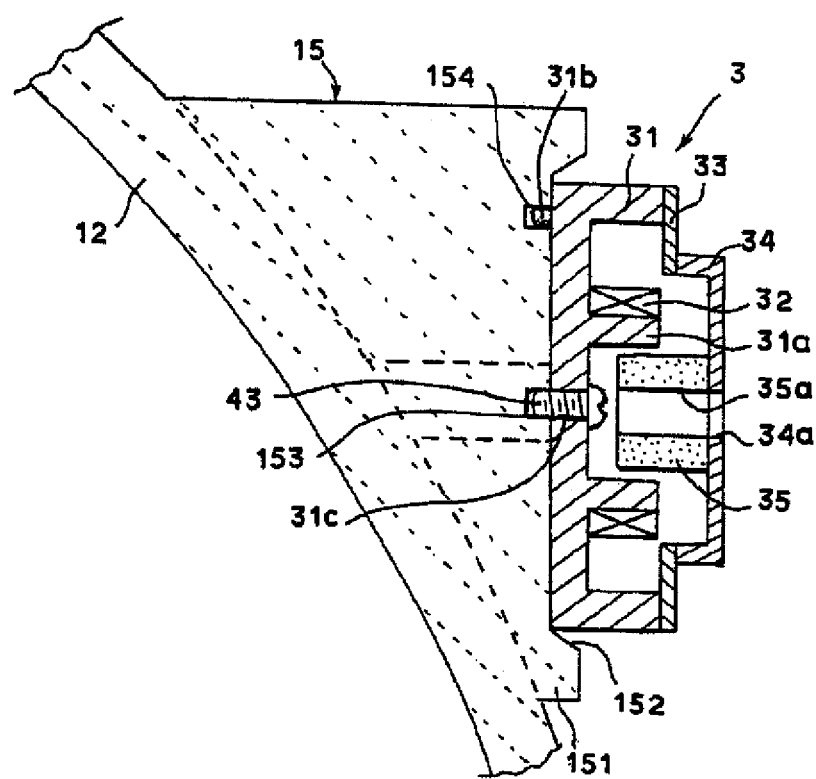
FIG. 12 is a cross-sectional view of a portion of the headlamp of the fifth embodiment.

FIG. 11 is a perspective view of the fastening seat 15, and FIG. 12 is a cross-sectional view illustrating a state in which the electromagnetic vibrator 3 is fixed to the fastening seat 15. The fastening seat 15 includes cross-shaped walls 151 extending from a portion of the inner surface of the front cover 12. The cross-shaped walls 151 have a crossed shape when viewed from the inner side, and the top surfaces (the rear surfaces) of the cross-shaped walls 151 are formed flat. The peripheral portions of the top surfaces of the cross-shaped walls 151 are formed higher than the central portions, and stepped portions 152 are provided between the peripheral portions and the central portions. When the front surface of the body 31 of the electromagnetic vibrator 3 comes into contact with the flat top surfaces of the cross-shaped walls 151, the outer peripheral wall of the electromagnetic vibrator 3 is positioned by the stepped portions 152. A screw hole 153 is formed at the center of the top surfaces of the cross-shaped walls 151, and a rotation preventing hole 154 is formed on the top surface of one of the walls 151.

The electromagnetic vibrator 3 according to this example has almost the same structure as the electromagnetic vibrators 3 of the first to fourth embodiments. However, the electromagnetic vibrator 3 of this example includes a hollow cylindrical magnet 35, and a vibrating plate 34 having a screw insertion hole 34a concentric with a center hole 35a of the magnet 35. The tabs 36 illustrated in the first to fourth embodiments are not provided. A screw 43 (an example of a fastener) is inserted into the screw insertion hole 34a, and is screwed into the screw hole 153 of the top surfaces of the cross-shaped walls 151 after passing through a fastening hole 31c of the body 31, so that the electromagnetic vibrator 3 is fixed to the fastening seat 15 by the screw 43. Further, a rotation preventing protrusion 31b formed on a portion of the front surface of the body 31 of the electromagnetic vibrator 3 is fitted into the rotation preventing hole 154 of the wall 151, so that the electromagnetic vibrator 3 is not rotated.

According to the fifth embodiment, the electromagnetic vibrator 3 is fixed to the curved inner surface of the front cover 12, but the electromagnetic vibrator 3 and the front cover 12 firmly contact with each other by the fastening seat 15. Accordingly, the vibration of the electromagnetic vibrator 3 is efficiently transmitted to the front cover 12 to increase a sounding effect. Further, the electromagnetic vibrator 3 is fastened to the fastening seat 15 by one screw 43 inserted into the opening of the electromagnetic vibrator 3, i.e., the center hole 35a of the magnet, the screw insertion hole 34a, and the fastening hole 31c. Thus, cost reduction is achieved by improving the work for fixing the electromagnetic vibrator 3 and by reducing the number of components. Furthermore, as shown in FIG. 10, the mounting hole 110 is formed through the back wall of the lamp body 11 and the detachable back cover 111 is provided to close the mounting hole 110. Thus, the electromagnetic vibrator 3 can be attached or detached by removing the back cover 111, so that the maintenance of the electromagnetic vibrator 3 is easy. Moreover, because the electromagnetic vibrator 3 is not visible from the outside through the front cover 12 by the extension 13 and the bumper BP, the external appearance of the headlamp HL is not deteriorated. The screw insertion hole 35a is formed through the center of the magnet 35. Accordingly, a rotationally symmetric magnetic field is generated, whereby the magnet 35 is vibrated uniformly, and the vibrating plate 34 is also vibrated uniformly.

Figure 13:
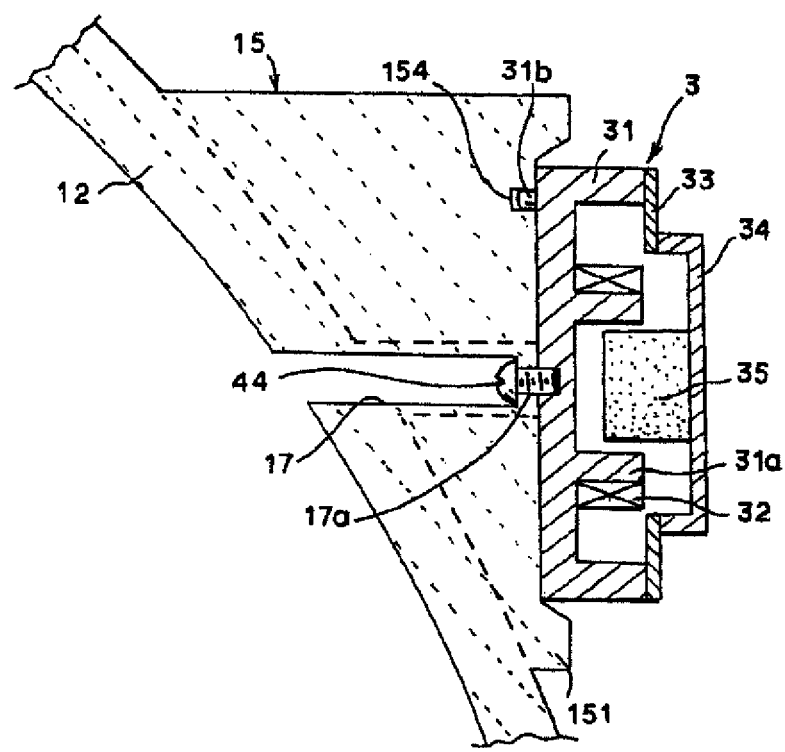
FIG. 13 is a cross-sectional view of a portion of a headlamp according to a modified example of the fifth embodiment.

Instead of inserting the screw 43 through the magnet of the electromagnetic vibrator 3, a recessed hole 17 may be formed toward the top surface of the fastening seat 15 from the front surface side of the front cover 12 as shown in FIG. 13, and a screw 44 (another example of a fastener) may be inserted into a screw insertion hole 17a formed at the bottom of the recessed hole 17 and screwed into the body 31 of the electromagnetic vibrator 3 from the front surface side to fix the electromagnetic vibrator 3 to the fastening seat 15. In this case, the magnet 35 does not need to be formed in a hollow cylindrical shape having the center hole 35a. Therefore, an electromagnetic vibrator having a more general configuration, like those in the first to fourth embodiments, can be used.

It is advantageous to use a screw 43, 44 made of the same material as the front cover 12 or a material similar to the material of the front cover 12. For example, the front cover 12 and the screw 43, 44 may both be made of polycarbonate. In this way, the screw 43, 44 and the front cover 12 have the same resonant frequency, so that the efficiency of the transmission of vibration from the electromagnetic vibrator 3 to the front cover 12 is increased.

Sixth Embodiment

Figure 14:
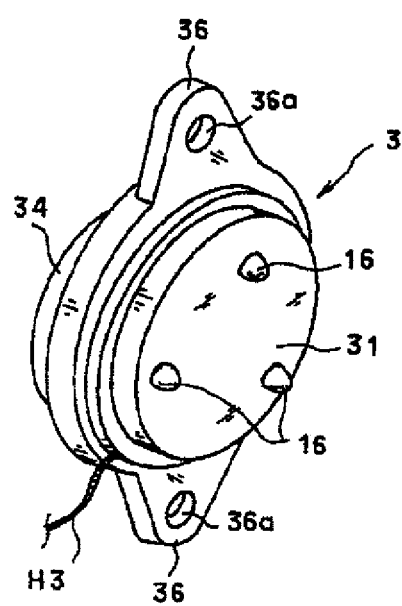
FIG. 14 is a perspective view of an electromagnetic vibrator of a headlamp according to a sixth embodiment of the present invention.

In embodiments described above, the electromagnetic vibrator 3 is brought into firm surface contact with the inner surface of the front cover 12. However, in so far as the vibration of the electromagnetic vibrator 3 is effectively transmitted to the front cover 12, only a portion of the electromagnetic vibrator may be brought into contact with the front cover. A sixth embodiment is such an example. As shown in FIG. 14, a plurality of protrusions, here, three protrusions 16, are provided at three locations on the surface of a body 31 of an electromagnetic vibrator 3 along a circumferential direction. In this illustrated example, each of the protrusions 16 has a shape like a hemisphere, and they all have the same height. The protrusions 16 are provided in the region where the amplitude of the vibration generated in the body 31 becomes as large as possible. It is advantageous to form the protrusions 16 and the body 31 in a one-piece structure, but the protrusions 16 may be formed separately from the body 31 and may be joined to the body 31 by means of adhesive or the like.

Figure 15:
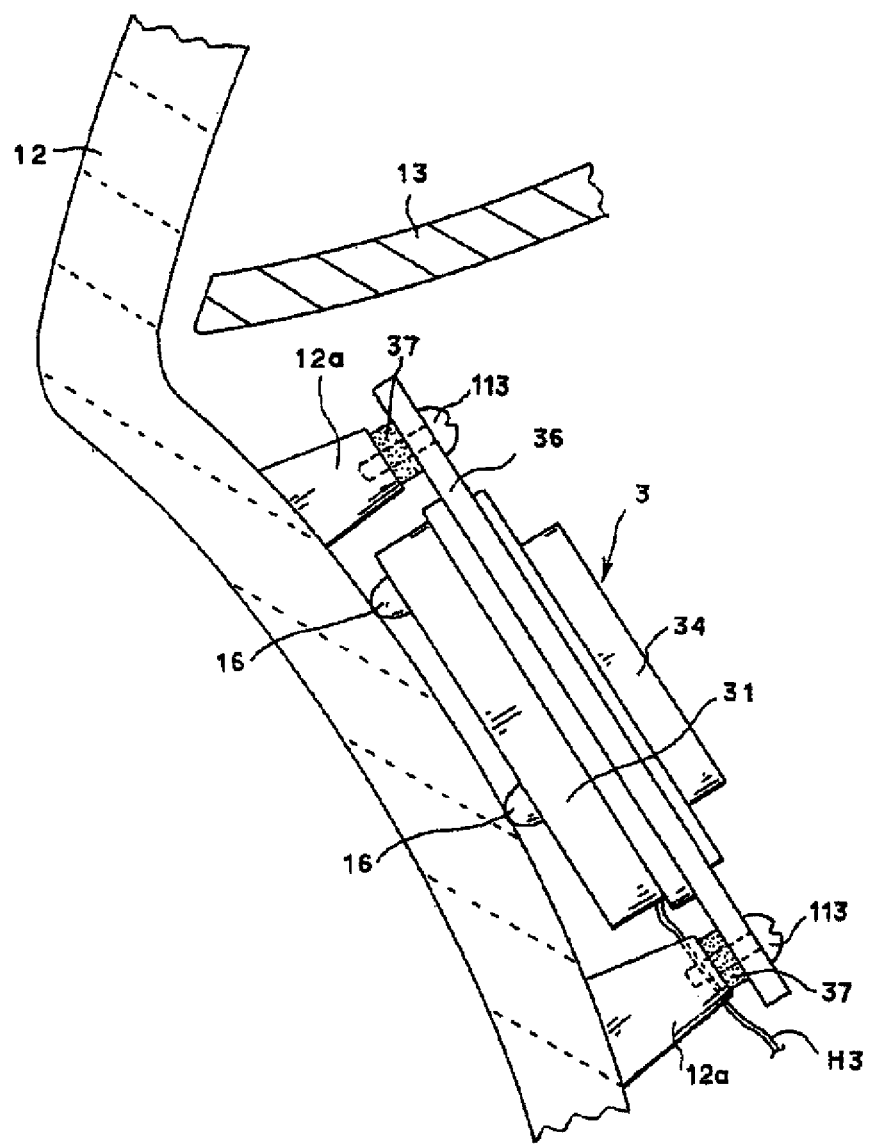
FIG. 15 is a cross-sectional view of a portion of the headlamp of the sixth embodiment.

As shown in a cross-sectional view of FIG. 15, the electromagnetic vibrator 3 is fixed by screws 113 using boss portions 12a formed on a portion of the front cover 12 that is not visible from the outside when installed in a vehicle. It is advantageous to provide washers 37 made of a cushioning material, such as rubber, between the electromagnetic vibrator 3 and each of the boss portions 12a. By attaching the electromagnetic vibrator 3 to the front cover 12 in this way, even when the inner surface of the front cover 12 is not flat, e.g., when it is curved, the washers 37 are elastically deformed in accordance with the fastening of the screws 113, and the electromagnetic vibrator 3 arranged in an inclined manner so as to correspond to the inner surface of the front cover 12. Accordingly, the ends of the respective protrusions 16 of the electromagnetic vibrator 3 contact the inner surface of the front cover 12. That is, the body 31 of the electromagnetic vibrator 3 is fixed to the inner surface of the front cover such that the electromagnetic vibrator 3 reliably contacts the inner surface of the front cover 12 at the protrusions 16, whereby vibration is effectively transmitted to the front cover 12 of the electromagnetic vibrator 3. Even when the inner surface of the front cover 12 is a wavy surface, a surface having a complicated shape, such as partially inclined surface, or a coarse surface, the protrusions 16 can reliably contact the inner surface.

Depending on the curvature of the inner surface of the front cover 12 or an angle of an inclined portion of the inner surface of the front cover 12, the protrusions 16 may be formed to have different heights so as to correspond to the condition of the inner surface. Further, the number of the protrusions 16 does not necessarily need to be three, and may be two or one. In any case, even when the electromagnetic vibrator 3 is arranged in an inclined manner, the electromagnetic vibrator 3 and the front cover 12 can be reliably brought into contact with each other at the protrusions 16. In addition, the protrusions 16 are provided at locations where the amplitude of vibration of the body 31 of the electromagnetic vibrator 3 is large. Thus, it is possible to effectively transmit the vibration of the electromagnetic vibrator 3 to the front cover 12 and to increase the sounding effect of the front cover 12, as compared to a case where only one side of the body 31 of the electromagnetic vibrator 3 contacts the inner surface of the front cover 12.

Figure 16:
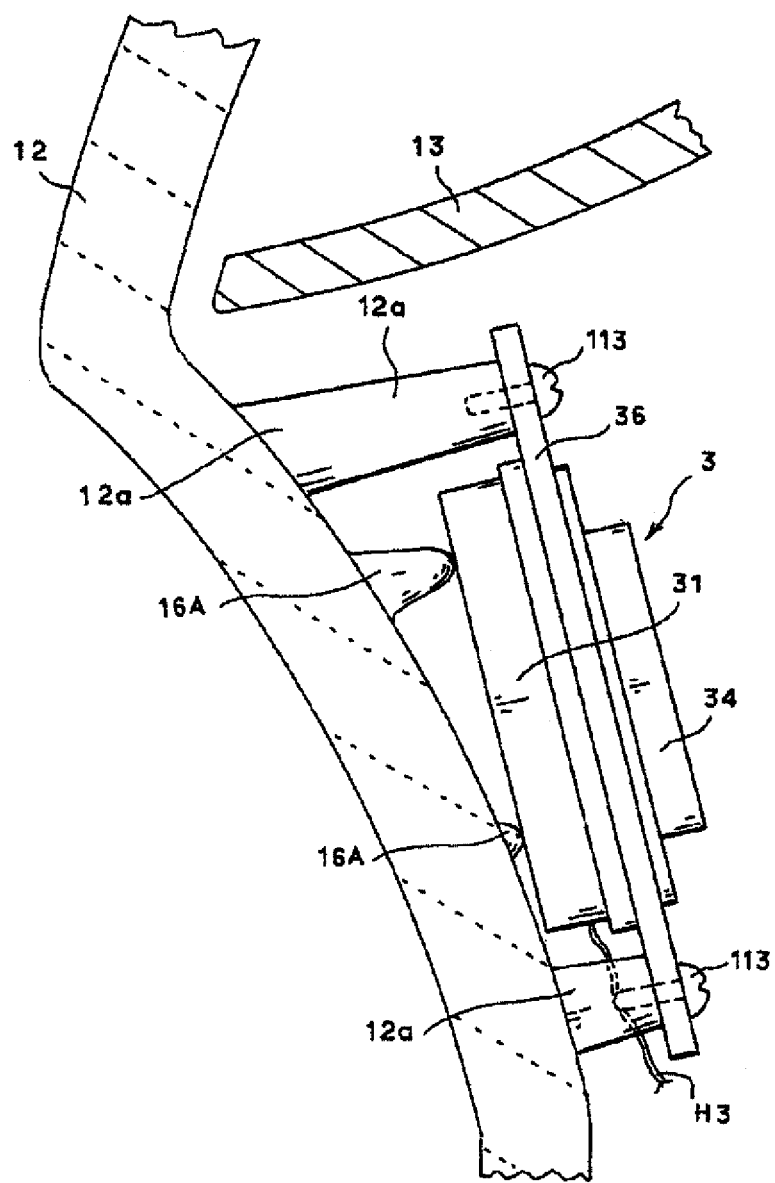
FIG. 16 is a cross-sectional view of a portion of a headlamp according to a modified example of the sixth embodiment.

As shown in FIG. 16, the protrusions 16A between the electromagnetic vibrator 3 and the front cover 12 may be formed on the inner surface of the front cover 12. The front cover 12 is made of a transparent material and is usually formed by die molding. Therefore, the protrusion 16A can be easily formed integrally with the front cover 12. The heights of one to three protrusions 16A are designed in accordance with the condition of the curvature or inclination of the inner surface of the front cover 12, so that the ends of the three protrusions 16A reliably contacts the surface of the electromagnetic vibrator 3. When providing three protrusions 16A, they can be designed such that a plane formed by connecting the ends of the protrusions 16A is oriented in a desired direction, and boss portions 12a for fixing the electromagnetic vibrator 3 may also be formed so as to have heights corresponding to the plane. In this case, the electromagnetic vibrator 3 is fixed to the boss portions 12a such that the surface of the electromagnetic vibrator 3 contacts the protrusions 16A. Therefore, cushioning washers 37 are not needed. Further, by providing the protrusions 16A on the front cover 12, the electromagnetic vibrator in the first to fourth embodiments can be used without modifying the electromagnetic vibrator 3.

Seventh Embodiment

Figure 17A:
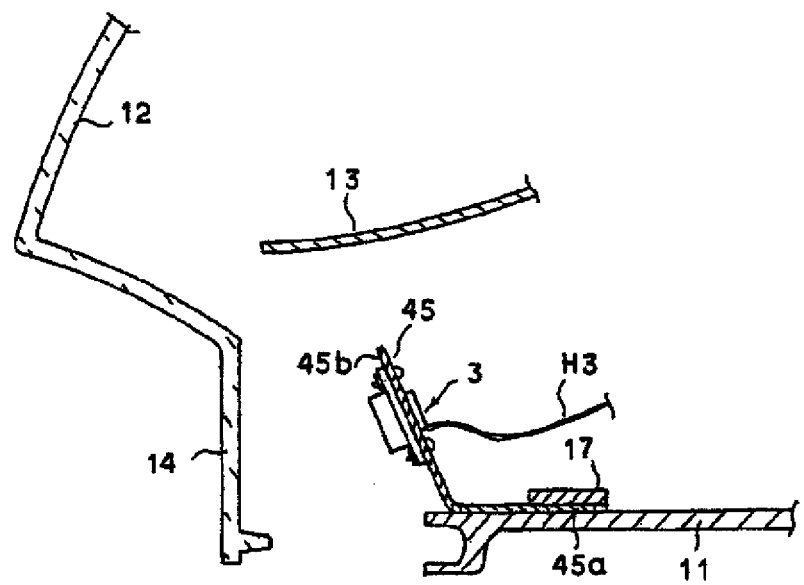
FIG. 17A is a cross-sectional view of a portion of a headlamp according to a seventh embodiment of the present invention, illustrating a state before attaching a front cover to a lamp body.
Figure 17B:
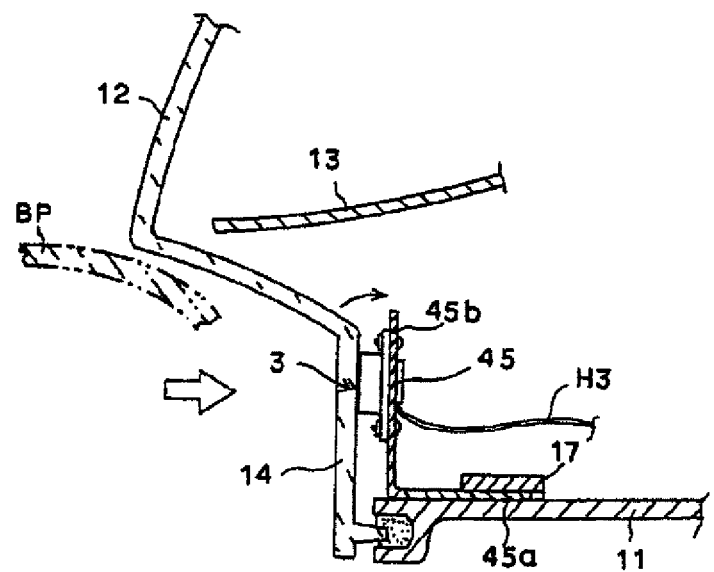
FIG. 17B is another cross-sectional view of a portion of the headlamp of the seventh embodiment, illustrating a state after attaching a front cover to a lamp body.

FIGS. 17A and 17B are cross-sectional views according to a seventh embodiment. In the seventh embodiment, an extended portion 14 having a shape of a flat plate is provided at the lower peripheral portion of a front cover 12 to extend in a vertical direction, and an electromagnetic vibrator 3 is brought into elastic contact with the inner surface of the extended portion 14 by an elastic force. FIG. 17A is a view illustrating a state where the front cover 12 is not yet attached a lamp body 1. A support frame 17 is provided on the lower inner surface of the lamp body 11 at a location corresponding to the extended portion 14 of the front cover 12, and an end portion of a lower side 45a of a L-shaped spring plate 45 (an example of a resilient member) is fitted to and supported by the support frame 17. The electromagnetic vibrator 3 is fixed to and supported by an upper side 45b of the spring plate 45. Tabs 36 of the electromagnetic vibrator 3 may be used to fix the electromagnetic vibrator 3, as in the first to fourth embodiments and the sixth embodiment. Before attaching the front cover 12, an angle between the lower side 45a and the upper side 45b of the spring plate 45 is larger than 90°, and the electromagnetic vibrator 3 is disposed at a position more forward than the front opening of the lamp body 11.

When the front cover 12 is mounted on the lamp body 11 as shown in FIG. 17B, the front surface of the body 31 contacts the inner surface of the extended portion 14 of the front cover 12, and the electromagnetic vibrator 3 is moved rearward. Because the upper side 45b of the spring plate 45 is elastically deformed rearward, the electromagnetic vibrator 3 is pushed forward by an elastic repulsive force of the spring plate 45, and is brought into elastic contact with the inner surface of the extended portion 14. Accordingly, the electromagnetic vibrator 3 firmly contacts the inner surface of the extended portion 14, the vibration of the electromagnetic vibrator 3 is efficiency transmitted to the extended portion 14 to generate a sound by the front cover 12. In so far as the electromagnetic vibrator 3 firmly contacts the inner surface of the front cover 12 when the front cover 12 is attached to the lamp body 11, the angle between the lower side 45a and the upper side 45b of the spring plate 45 may be smaller than 90°. Also when the angle between the lower side 45a and the upper side 45b of the spring plate 45 is smaller than 90°, the spring plate 45 is arranged such that the upper side 45b is inclined toward the front cover 12 before attaching the front cover 12. In the seventh embodiment, the electromagnetic vibrator 3 can be attached and detached using the back cover 111 provided on the back surface of the lamp body 11, as in the fifth and sixth embodiments. Accordingly, the maintenance of the electromagnetic vibrator 3 is easy.

In the seventh embodiment, if an extended portion cannot be formed on the front cover 12 at the position where an elastic contact can be made with the electromagnetic vibrator 3, and the inner surface of the front cover 12 is curved, a fastening seat 15 having a flat top surface may be provided integrally with the front cover 12 as in the fifth embodiment so that the electromagnetic vibrator 3 can elastically contact the fastening seat 15. Alternatively, like in the sixth embodiment, one to three protrusions 16, 16A may be formed on the surface of the body 31 of the electromagnetic vibrator 3 or the inner surface of the front cover 12, so that the surface of the electromagnetic vibrator 3 elastically contacts the inner surface of the front cover 12 at the protrusions. In any case, even when the inner surface of the front cover 12 is curved, it is possible to make the surface of the electromagnetic vibrator 3 reliably contact the inner surface of the front cover 12 to generate a sound by effectively vibrating the front cover 12.

According to one or more embodiments, the transparent front cover may be a lens that refracts light emitted by the light source.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle lamp comprising:
a light source;
a front cover made of a transparent material to transmit the light emitted by the light source;
a lamp body forming a lamp housing together with the front cover; and
a vibrator directly contacted with the front cover to generate a vibration sound,
wherein the vibrator is supported by the lamp housing such that the vibrator contacts the front cover at a location where, when the vehicle lamp is mounted on a vehicle, the vibrator is not visible from an outside of the vehicle lamp,
wherein the front cover comprises a flat extended portion, and the vibrator is provided on the extended portion, and
wherein the front cover, including the extended portion, is formed as a one-piece structure.

2. The vehicle lamp according to claim 1, wherein the extended portion is opaque.

3. The vehicle lamp according to claim 1, wherein the vibrator is an electromagnetic vibrator comprising a coil and a magnet.

4. The vehicle lamp according to claim 1, further comprising:
a reflector that reflects light emitted by the light source in a forward direction,
wherein the vibrator is positioned further in the forward direction than the reflector.

5. The vehicle lamp according to claim 1, further comprising a back cover supporting the vibrator, wherein the lamp body comprises a mounting hole, and the back cover is detachably attached to a portion of the lamp body to close the mounting hole.

6. The vehicle lamp according to claim 5, further comprising a sounding controller connected to the vibrator to control the vibrator, wherein the sounding controller is provided on the back cover.

7. The vehicle lamp according to claim 1, further comprising an extension arranged inside the lamp housing and between the front cover and the vibrator.

8. The vehicle lamp according to claim 7, wherein the vibrator is arranged below the extension.

9. A vehicle lamp comprising:
a light source;
a front cover made of a transparent material to transmit light emitted by the light source;
a lamp body forming a lamp housing together with the front cover; and
a vibrator configured to vibrate the front cover to generate a vibration sound,
wherein the vibrator is supported by the lamp housing such that the vibrator contacts the front cover at a location where, when the vehicle lamp is mounted on a vehicle, the vibrator is not visible from an outside of the vehicle lamp, and
wherein the front cover comprises a fastening seat provided on a curved inner surface of the front cover, wherein the fastening seat is a portion of a one-piece structure of the front cover, and the fastening seat comprises a flat surface on which the vibrator is provided.

10. The vehicle lamp according to claim 9, wherein an opening is formed through one of the fastening seat and the vibrator, and the vibrator is fixed to the fastening seat by a fastener inserted into the opening.

11. A vehicle lamp comprising:
a light source;
a front cover made of a transparent material to transmit light emitted by the light source;
a lamp body forming a lamp housing together with the front cover; and
a vibrator configured to vibrate the front cover to generate a vibration sound,
wherein the vibrator is supported by the lamp housing such that the vibrator contacts the front cover at a location where, when the vehicle lamp is mounted on a vehicle, the vibrator is not visible from an outside of the vehicle lamp, and
wherein one of the front cover and the vibrator comprises a protrusion, and the front cover and the vibrator are in contact with each other at the protrusion.

12. A vehicle lamp comprising:
a light source;
a front cover made of a transparent material to transmit light emitted by the light source;
a lamp body forming a lamp housing together with the front cover; and
a vibrator configured to vibrate the front cover to generate a vibration sound,
wherein the vibrator is supported by the lamp housing such that the vibrator contacts the front cover at a location where, when the vehicle lamp is mounted on a vehicle, the vibrator is not visible from an outside of the vehicle lamp,
wherein the vehicle lamp further comprises a resilient member via which the vibrator is supported on the lamp body, and
wherein the vibrator elastically contacts an inner surface of the front cover by an elastic force of the resilient member.

* * * * *